United States Patent [19]

Hahn et al.

[11] Patent Number: 4,483,669
[45] Date of Patent: Nov. 20, 1984

[54] MULTIPLE-LAYERED SHEETING APPARATUS

[75] Inventors: Granville J. Hahn; Raleigh N. Rutledge; Jackie D. Murley, all of Big Spring, Tex.

[73] Assignee: Cosden Technology, Inc., Dallas, Tex.

[21] Appl. No.: 485,141

[22] Filed: Apr. 15, 1983

Related U.S. Application Data

[63] Continuation-in-part of Ser. No. 408,105, Aug. 16, 1982, Pat. No. 4,443,397.

[51] Int. Cl.³ .............................................. B29F 3/04
[52] U.S. Cl. .................................. 425/131.1; 264/171; 425/133.5; 425/146; 425/376 A; 425/462; 425/466
[58] Field of Search .............................. 264/171, 173; 425/131.1, 133.1, 133.5, 376 A, 146, 462, 466, 465

[56] References Cited

U.S. PATENT DOCUMENTS

| | | | |
|---|---|---|---|
| 3,756,758 | 9/1973 | Prall | 425/467 |
| 3,833,704 | 9/1974 | Nissel | 264/171 |
| 3,918,865 | 11/1975 | Nissel | 264/171 |
| 3,924,990 | 12/1975 | Schrenk | 425/462 |
| 3,968,196 | 7/1976 | Wiley | 264/171 |
| 4,094,947 | 6/1978 | Alfrey, Jr. et al. | 264/171 |
| 4,100,237 | 7/1978 | Wiley | 264/171 |
| 4,144,011 | 3/1979 | Sponaugle | 425/462 |
| 4,165,210 | 8/1979 | Corbett | 425/462 |
| 4,208,175 | 6/1980 | Rosenbaum | 425/462 |
| 4,249,875 | 2/1981 | Hart et al. | 425/462 |
| 4,336,012 | 6/1982 | Koch et al. | 425/462 |

FOREIGN PATENT DOCUMENTS

| | | | |
|---|---|---|---|
| 2813613 | 10/1978 | Fed. Rep. of Germany | 264/171 |
| 3010691 | 9/1981 | Fed. Rep. of Germany | 264/171 |
| 2343582 | 11/1977 | France | 425/131.1 |
| 55-28887 | 2/1980 | Japan | 264/171 |
| 56-150515 | 11/1981 | Japan | 264/171 |
| 57-13420 | 3/1982 | Japan | 264/171 |

*Primary Examiner*—Jeffery Thurlow
*Attorney, Agent, or Firm*—Schwartz, Jeffery, Schwaab, Mack, Blumenthal & Koch

[57] ABSTRACT

Disclosed is a process and apparatus for extrusion of multiple-layer sheeting comprising an improved co-extrusion feedblock and valve plate for laying down co-extruded resin streams onto a main extruded polymeric resin. The new design provides advantageous external control of the layer number as well as a more refined control of layer thicknesses.

11 Claims, 7 Drawing Figures

MULTIPLE-LAYERED SHEETING APPARATUS

CROSS-REFERENCE TO RELATED APPLICATION

The present application is a continuation-in-part of our copending application, Ser. No. 408,105, filed Aug. 16, 1982, now U.S. Pat. No. 4,443,397 issued Apr. 17, 1984.

BACKGROUND OF THE INVENTION

The present invention relates to the production of multiple-layer film or sheeting, and more especially, to an improved process and apparatus for extrusion of multiple-layer sheeting having a layer or layers of polymeric material having desirable surface characteristics. More especially, the present invention comprises the co-extrusion of multiple-layered sheeting, with each layer exhibiting uniform layer thickness across the width thereof, by an apparatus which has an improved laydown means and which is easily adjustable to produce sheeting products having from two to five layers.

Co-extrusion processes for the production of multi-layered sheeting are, of course, well known in the art. However, prior processes do not guarantee, and and often do not produce, co-extruded layers of uniform thickness on the main extruded material. This problem is especially acute when the co-extruded layer comprises a polymeric material having a comparatively low viscosity. Such a material tends to migrate from areas of higher extruder die pressure, to areas of lower extruder die pressure. This results in a sheeting product having varying layer thicknesses across the width of the sheet.

Furthermore, in known processes and apparatus, it was not readily possible to adjust the relative thickness of the various layers, in response to different processing characteristics and/or different requirements for the final products. Furthermore, it was not easy to vary the number of layers to be included in a particular product or to distribute the various layers to give a uniform multiple layer sheet. In these processes, it is often necessary to shut down operation while adjustments and/or modifications are made in the process. A shutdown of this type is extremely time-consuming and expensive due to the cost of labor, materials and lost output.

Thus, the present invention is concerned with an improved laydown means and process for use in the production of multiple-layered sheeting of materials, particularly those which have different processing characteristics, resulting in a uniformity of layer thickness across the entire width of the extruded sheeting.

The present invention is also directed to an improved laydown means for the application of multiple-layers of polymeric material to an initial polymeric base layer, the different polymeric materials in most cases exhibiting different processing characteristics. The laydown device permits easy adjustment of overall layer thickness as well as adjustment of the number of layers.

SUMMARY OF THE INVENTION

It is therefore an object of the present invention to provide a co-extrusion apparatus for producing multiple-layer sheeting having an improved laydown means for applying a layer or layers of uniform thickness(es) across its width.

Another object of the present invention is to provide a co-extrusion apparatus for producing multiple-layer sheeting having a laydown means for applying a layer or layers of polymeric materials to a base polymer layer, the polymeric materials exhibiting different processing characteristics, resulting in sheeting comprising a layer or layers of uniform thickness(es) across their width.

Still another object of the present invention is the provision of an apparatus for producing multiple-layer sheeting having simple means for controlling the thickness of individual layers at any point across the entire width of the sheeting and for controlling the number of the layers of the sheeting.

Yet another object of the present invention is to provide an apparatus for producing multiple-layer sheeting which can be completely externally controlled to vary layer thickness and layer number.

Still yet another object of the present invention is to provide an apparatus and a process for providing online variations of the layer thickness and layer number.

A further object of the present invention is to provide a process for producing in a single extrusion step multiple-layer sheeting having uniform layer thickness across the width of the sheeting.

Still another object of the present invention is to provide a process for producing in a single extrusion step multiple-layer sheeting wherein the number and thickness of layers can be simply controlled.

Yet another object of the present invention is the provision of a process for producing a multiple-layered sheeting applicable to a wide variety of polymeric materials for use as both the extruded base layer and the co-extruded laydown resin.

Thus, in accomplishing the foregoing and other objectives, there is provided in accordance with one aspect of the present invention a co-extrusion apparatus for the production of multi-layer products of thermoplastic synthetic resins having selected numbers of layers, comprising a main extruder for producing a main heat-plasticized resin stream, at least one co-extruder for producing a source of heat plastified resin stream, a co-extrusion feedblock positioned downstream of the extruder and the co-extruder for receiving the main resin stream and the side resin stream and for producing a combined resin stream, the co-extrusion feedblock comprising at least one slotted valve plate having a central orifice which provides for the passage of the main resin stream, slotted portions on either side of the central orifice for laying down layers of the side resin stream onto the main resin stream and valve means for controlling the side resin stream, conduit means within the co-extrusion block for splitting the side resin stream and supplying sub-streams thereof to the slotted portions, adjustment means for varying the volume of flow in each of the sub-streams, and a sheeting die downstream of the co-extrusion block for receiving the combined stream and for forming the multi-layered product into a multi-layered sheet.

In a preferred embodiment of the present invention, the co-extruder feedblock is positioned between the main extruder and the sheeting die along the base layer flowpath, and comprises a central orifice aligned with the central orifice of the slotted die providing for the passage of the base layer therethrough.

In another aspect of the present invention, there is provided a co-extrusion feedblock used in the production of multiple-layer products of thermoplastic synthetic resins having selected numbers of layers, comprising first conduit means within the feedblock for receiving and transporting a main heat-plasticized resin stream through the feedblock, and second conduit means within the feedblock for receiving at least one side stream of co-extruded heat plasticized resin, for splitting said co-extruded resin stream into sub-streams, and for transporting the sub-streams for application to the main resin stream.

In a preferred embodiment, the feedblock further comprises externally adjustable screws for engaging the second conduit means and for controlling the flow of the resin sub-streams.

In another aspect of the present invention, there is provided a process for producing a multi-layer sheeting, comprising the steps of extruding a base layer stream of a heat-plastified material, co-extruding at least one side stream of a heat-plastified material, passing the base layer stream through a co-extrusion feedblock, passing the side stream into the feedblock, splitting the side stream in the feedblock into two sub-streams, selectively passing the sub-streams to a selected valve plate member attached to the feedblock, the valve plate member having a slot for each sub-stream and valve means for controlling the resin flow therethrough, laying down at least one layer of the sub-stream upon the base layer stream at the plate member to produce a multi-layered stream, and passing the multi-layered stream through an extrusion die to form the multi-layered sheeting.

Other objects, features and advantages of the present invention will become apparent from the detailed description of preferred embodiments which follows, when considered in view of the accompanying drawings.

DETAILED DESCRIPTION OF PREFERRED EMBODIMENTS

In accordance with the present invention, there have been provided an improved process and apparatus for producing a multiple-layered sheet or film having layers of uniform thickness across the entire sheeting or film. More particularly, the sheet or film may be produced from two or more polymeric materials exhibiting different processing characteristics, particularly melt viscosity. Specifically, the sheeting or film can comprise from one to four or more layers of co-extruded resinous material applied to a polymeric base layer. In each case, each of the individual co-extruded layers exhibits uniform thickness across its width. Thus, by the combination of these different layers, a product is obtained having improved characteristics, especially improved surface characteristics. Because of the uniform thickness, such a product will exhibit a consistency in the improved characteristic not previously possible. An example of a product which the present invention can provide is a plastic cup of the type presently used by the airlines. Such a cup would comprise a base layer of polystyrene and a co-extruded polyethylene terephthalate (PET) surface layer. This is only one example of many products within the scope of the present invention.

Figure 1:
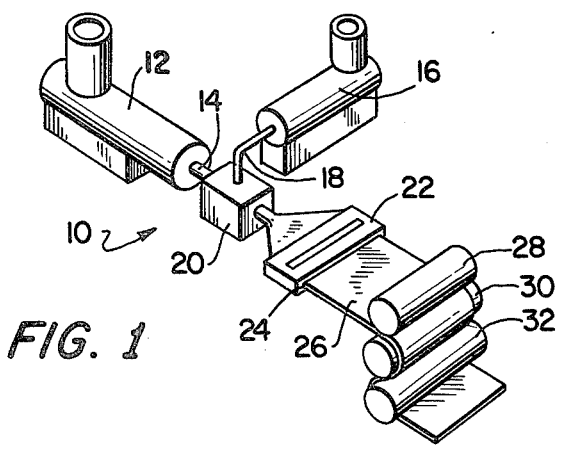
FIG. 1 is a schematic view of an apparatus for the preparation of a multiple-layer sheet or film according to the present invention.

Referring now to the drawings, in FIG. 1 there is schematically illustrated an apparatus, generally designated by the reference numeral 10, particularly adapted for the process of the invention. The apparatus 10 comprises in cooperative combination a main extruder 12 for the extrusion of a first synthetic resinous material, and connected thereto, a discharge conduit 14. A first co-extruder 16 having a discharge conduit 18 is adapted for providing a stream of heat plastified synthetic resin. Conduit 18 terminates at co-extrusion block 20 at a point upstream of the sheeting die 22 which is in operative communication with co-extrusion block 20 and receives the flow therefrom. Sheet 26 is formed at the die lips 24 and thereafter progresses from the die to polished cooling rollers 28, 30 and 32.

Figure 2:
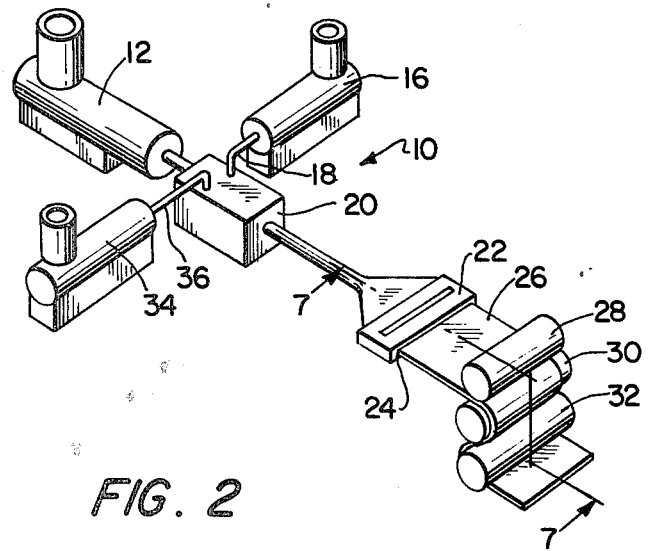
FIG. 2 is similar to FIG. 1, and represents an apparatus having two co-extruders for the preparation of a multiple-layer sheet or film.

In FIG. 2 there is schematically illustrated an apparatus similar to that of FIG. 1, except that in FIG. 2 there are shown two co-extruders as compared to the one co-extruder of FIG. 1. Therefore, in addition to the apparatus described in FIG. 1, the apparatus 10 further comprises a second co-extruder 34 having a discharge conduit 36 connected thereto. The discharge conduit 36 terminates in approximately the same area of the co-extrusion block 20 as discharge conduit 18.

Figure 3:
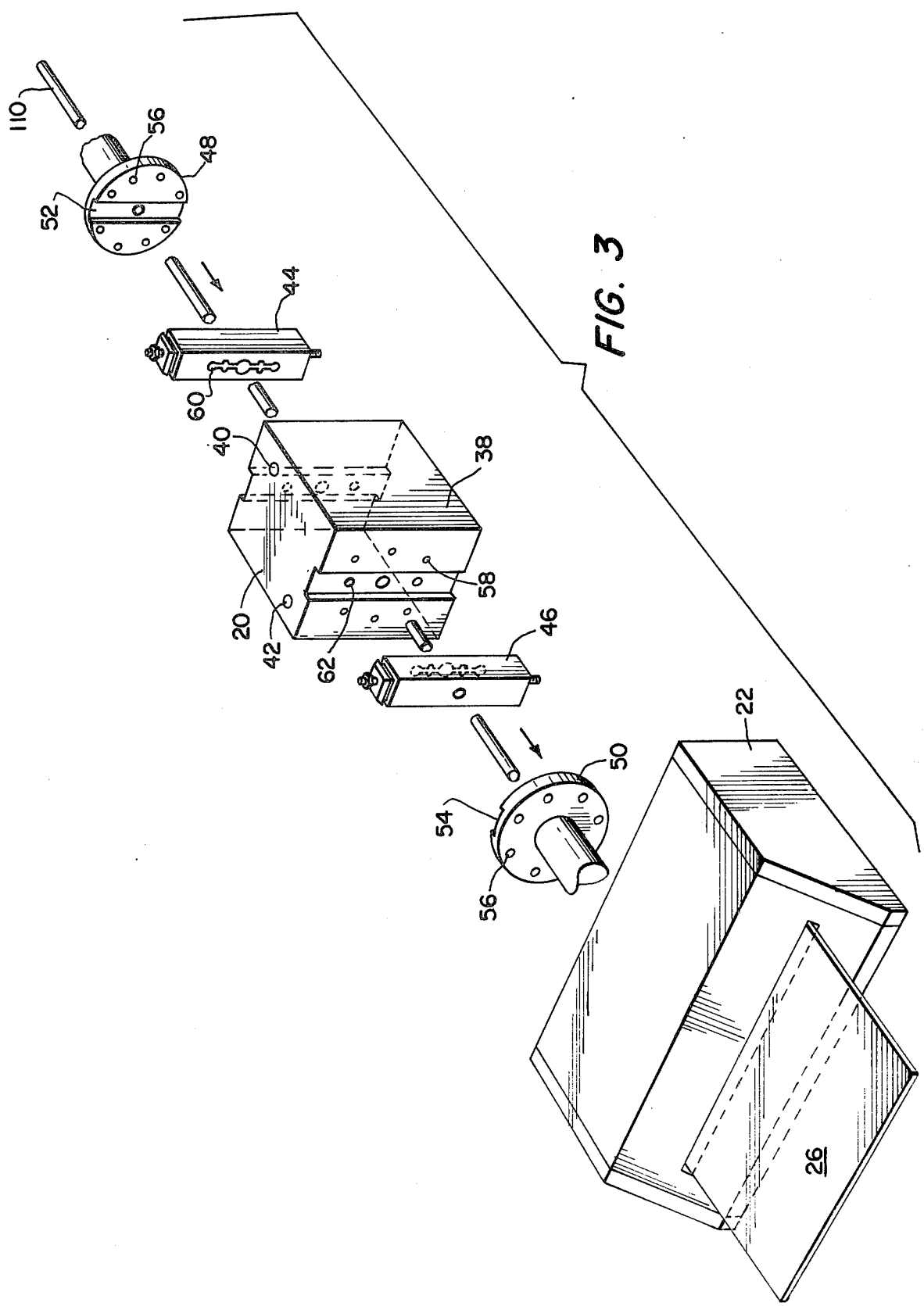
FIG. 3 is an exploded schematic view of the feedblock and extrusion die according to the present invention.

In FIG. 3 there is illustrated an internal, exploded perspective view of co-extrusion block 20. The block 20 comprises a main co-extrusion body 38. The block further comprises conduit inlets 40 and 42 for receiving the co-extruded synthetic resin streams from co-extruders 16 and 34 of FIGS. 1 and 2. Slotted valve plates 44 and 46 are positioned upstream and downstream of the main co-extrusion body, respectively. These plates are held in place by the slotted housing members 48 and 50, respectively. Each housing member comprises a slot 52, 54 for receiving the slotted valve plates, and a series of bolt holes 56 corresponding to similar holes 58 on the main co-extrusion body. The slotted valve plates 44 and 46 have slotted orifices, generally indicated at 60, which align with outlet orifices, generally indicated at 62, of the feedblock for providing passage for the co-extruded resin streams passing through feedblock 20.

Figure 4:
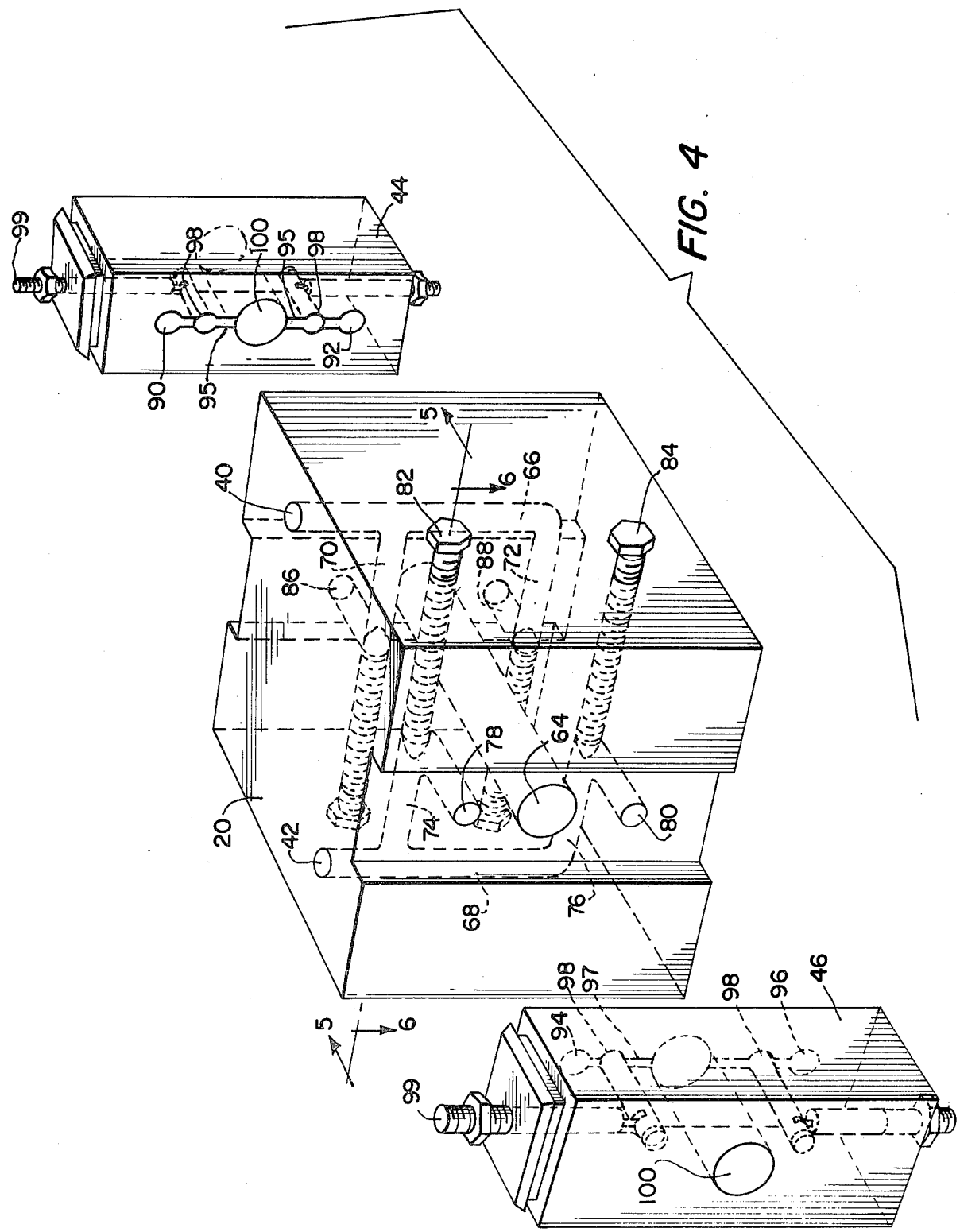
FIG. 4 is a detailed schematic representation of the feedblock.

FIG. 4 is a detailed perspective illustration of the feedblock 20 described above as would be seen looking upstream of the feedblock. The feedblock has a main conduit 64 through which the main stream of synthetic resin passes. The conduit 64 extends completely through the feedblock As previously noted, the feedblock has conduit inlets 40 and 42 for receiving co-extruded heat-plasticized resin side streams. The inlets 40, 42 lead to conduits 66 and 68 which extend vertically downwards therefrom. Each conduit 66, 68 branches into two horizontally extending conduits 70, 72 and 74, 76. The branch conduits are positioned vertically one above the other and extend approximately perpendicularly from the vertically extending shaft. The vertically extending shafts terminate into the lower conduits 72 and 76. This arrangement functions to divide the resin streams entering at inlets 40 and 42 into two sub-streams each.

The branch conduits extend from the vertically extending conduits 66 and 68 which are offset from the central longitudinal axis, toward this central axis to points equal distance above and below the main resin flow stream 64. The branch conduits then are curved in a manner which aligns the flow of the co-extruded polymers with that of the main resin stream.

Figure 5:
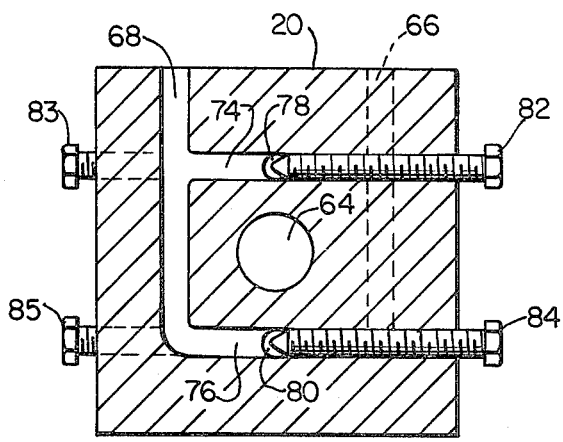
FIG. 5 is a cross-sectional end view of the feedblock taken along the line 5—5 of FIG. 4.
Figure 6:
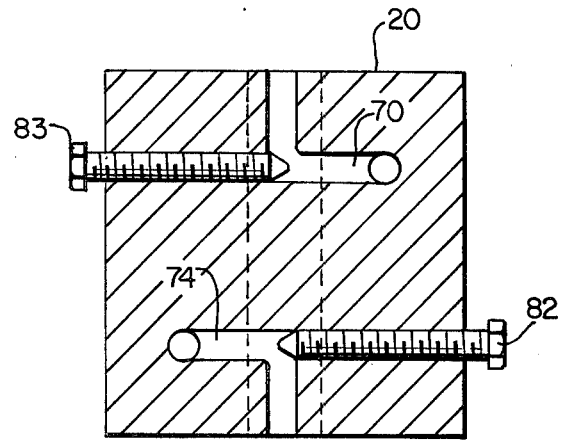
FIG. 6 is a cross-sectional top view of the feedblock taken along line 6—6 of FIG. 4.

Extending horizontally into the branch conduits 74 and 76 at this point of curvature are flow controlling screws 82 and 84, also shown in FIGS. 5 and 6. A similar screw arrangement is provided to conduits 70 and 72. By engaging the branch conduits at this point, the screws can easily and precisely control the resin flow through the conduits This control is accomplished by adjusting the screws to the penetration depth necessary. This particular arrangement is very useful in shutting off the flow of one or more of the streams when only a two- or three-layer product is required.

The branch conduits terminate at outlets vertically aligned with the main resin stream. As shown, conduits 74 and 76 terminate at outlets 78 and 80, respectively. Conduits 70 and 72 have similar outlets 86 and 88.

The outlet orifices 78, 80 and 86, 88 are aligned with inlet bores 90, 92 and 94, 96 of the valve plates 44 and 46, respectively, thus providing for the passage of the resin from the feedblock to the valve plates. Slots 95 and 97 connect the inlet bores to the main resin conduit 100 and pass over a further cavity described below.

The valve plates are provided with means by which the flow of polymer that passes to the valve plate can be valved, or controlled, to determine the amount provided to the main resin stream which, of course, determines the final layer thickness. This valving means basically comprises a camsert arrangement positioned within a cavity, generally shown as 98 in FIG. 4. The camsert and valve plate arrangement is described in greater detail in copending application Ser. No. 485,550, Valve Plate and Feedblock Design and Process Therefor, Granville J. Hahn et al, the disclosure of which is hereby incorporated by reference.

As previously mentioned, FIGS. 5 and 6 further illustrate the feedblock and conduit design according to the present invention. FIG. 5 is a sectional end view which shows the branch conduits 74 and 76 extending from vertical conduit 68 toward the center of the feedblock 20 and terminating at outlets 78 and 80 vertically arranged on opposite sides of the main resin conduit 64. Screws 82 and 84 are shown extending to engage the branch conduits 74 and 76 to control the resin flow. This view also more clearly shows screws 83 and 85 which engage branch conduits 70 and 72 (not shown) in a manner similar to that of screws 82 and 84. Vertical conduit 66 is also illustrated.

FIG. 6 is a top cross-sectional view of the feedblock 20 and more clearly shows the conduitscrew relationship. The engagement of the screws 82 and 83 into the conduits 70 and 74 in the vicinity of the conduit bends is clearly shown.

Figure 7:
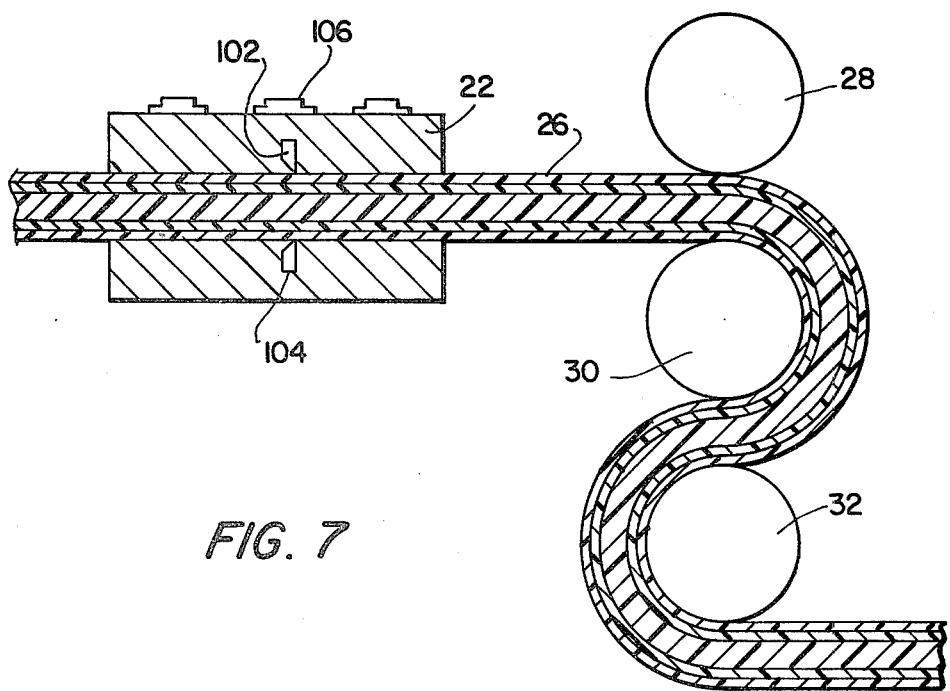
FIG. 7 is a cross-sectional view of the layer thickness adjusting apparatus taken along line 7—7 of FIG. 2.

FIG. 7 is a cross-sectional view of the extrusion die and rollers taken along line 7—7 of FIG. 2. There is shown the sheeting die 22 having the extruded product 26 passing therethrough. Restrictor bars 102 and 104 can be adjusted depending upon processing conditions. Instrument 106 measures product thickness and can be adjusted accordingly. Finally, as previously discussed, polished cooling rollers 28, 30 and 32 are provided downstream of the die to cool the multiple-layered sheeting In the co-extrusion process of the present invention, there is provided by extruder 12 a base layer stream, generally referred to as 110 in FIG. 3. The composition of the base layer stream can be selected from a wide variety of polymers. As a practical matter, a lower grade, less-expensive polymer is used. Such polymers are usually inferior with regard to certain characteristics, for example, appearance. Examples of appropriate materials for use as a base layer include polystyrene, both the homopolymers and copolymers thereof. Included within this latter category are impact polystyrenes which comprise graft copolymers of styrene upon conjugated diene backbone polymers such as polybutadiene, butadiene-styrene copolymers, butadiene-acrylonitrile copolymers, natural rubber, etc. Likewise included in this category are normal copolymers of styrene with other well-known, conventional monomers. This list is by no means limiting.

This base layer stream 110 then passes into the co-extrusion block of FIGS. 3 and 4. Also entering the co-extrusion block are co-extruded resin streams through inlet passages 40 and 42, these co-extruded streams coming from discharge conduits 18 and 36 of co-extruders 16 and 34, respectively.

For the sake of a more complete description, the present invention will be described with reference to the embodiment wherein there are two co-extruded resin streams, and thus, subsequently four layers applied to the base sheeting, two layers to each side.

Specifically referring to FIG. 4, the co-extruded streams enter the feedblock 20 through inlet passages 40 and 42, and pass through the main co-extrusion body via conduits 66 and 68 and are then divided into sub-streams by passing through branch conduits 70, 72 and 74, 76. The sub-streams pass through the branch conduits past the screws 82–85. These screws determine the number and extent of the streams which eventually will be applied to the main resin stream. By engaging and disengaging the screws into the conduit paths, resin flow is controlled. By complete engagement into the path, the entire flow is retarded. Thus the screws provide a simple means for controlling the presence of the layers to the base sheeting.

An advantageous result of the present invention is the control of the layer application by external means. By utilizing the screw arrangement herein described, the operator can monitor the sheeting as it is produced and quickly and easily vary the polymer applied to the main resin layer by simple manual adjustment of the screws. Additionally, should process requirements necessitate an increase or decrease in the number of layers, simple manipulation of the screws will accomplish this requirement. This results in insignificant loss of time and product when such changes are required and can be accomplished online. Previously, such adjustment resulted in loss of time and production due to shutdown and to faulty product produced during initial startup as the process was being refined to meet requirements.

Assuming that all four co-extruded streams will be applied to the main resin stream, the streams exit the feedblock 20 at outlets 78, 80 and 86, 88 which communicate directly with inlet bores 90, 92, 94 and 96 of the value plates 44 and 46. The resin streams pass from these bores through slots 95 and 97 to the main resin orifice 100 where the co-extruded resins are applied to the main polymer resin.

As the resins progress from the inlet bores to main orifice 100, they pass over a camsert cavity having a camsert therein. A "camsert" is used here to describe a restrictor means which is cam operated. The camsert is controlled within the cavity so as to move perpendicularly to the resin flow. In advancing the camsert in the cavity, the camsert constricts the resin flow, and thus, would result in a reduction in flow and layer thickness. Likewise, should the layer thickness be too small, the camsert can be withdrawn the necessary distance thus allowing an increase in resin flow to conduit 100. The valving arrangement provides a high degree of layer thickness control and adjustment.

The means for controlling the movement of the camsert are, like the feedblock screw arrangement, housed externally to the value plate and are easily accessible to the operator. The combination of the two external flow control means allows easily accessible and adjustable control of the layers of the sheeting product with reduced time and cost.

The co-extruded resinous materials of the present invention can be selected from a variety of polymeric materials. Synthetic resins within the scope of the invention include PVF (polyvinyl fluoride), ABS (acrylonitrile-butadiene-styrene), PET (polyethylene terephthalate), HIPS (high impact polystyrene), acrylic resins, polyolefins, etc. This list is exemplary and by no means limiting. Any thermoplastic synthetic resins which are customarily extruded are within the scope of the invention.

The following specific example is provided to facilitate a better understanding of the invention, it being understood that the same is intended to be merely illustrative and in no way limitative.

EXAMPLE

A main resin stream of high impact polystyrene (Cosden Oil and Chemical Co. 825D pellets) is extruded from a 3½ inch diameter two stage vented extruder containing a 4:1 compression ratio screw. Two 2½ inch diameter 30:1 single stage side extruders also having a 4:1 compression ratio screw are arranged as illustrated in FIG. 2 and supply a second adhesive layer of DuPont CXA 3101, and a third stream of PETG (polyethylene terephthalate glycol) (Eastman Kodar 6763). The polystyrene is extruded at a temperature of 440° F. and a feed rate of approximately 680 lbs./hr. The adhesive side stream is discharged from the 2½ inch extruder at 330° F. and at a feed rate of approximately 5–10 lbs/hr. The PETG stream is discharged from the 2½ inch extruder at 505° F. and at a feed rate of approximately 30 lbs./hr.

The first side stream is divided into two streams. The flow of one of the two streams is then completely stopped so that only one layer of adhesive is applied to form an intermediate layer on one side of the polystyrene. The second side stream is also divided into two streams, and likewise, the flow of one of these two streams is completely stopped so that only one layer of PETG is applied, the PETG layer being applied to the adhesive layer previously formed. There results a single stratified stream having junction interfaces between the three separate layers. The combined stream is conducted to an extrusion die orifice 52 inches wide with lips set at approximately 100 mils. The die temperature averages about 460° F.

Upon leaving the die lips, the extruded sheet passes a series of three 18-inch polished chrome cooling rolls, the top roll maintained at 160° F., middle roll at 180° F. and bottom roll at 150° F. Roll pressures at top and bottom are maintained at 20 psi, and at a gap setting of 100 mils.

Examination of the final sheeting product evidences essentially uniform layers of the PETG, adhesive and impact polystyrene The thickness of the layer of the impact polystyrene is 88 mils The thickness of the adhesive layer is approximately 2 mils, and the thickness of the PETG is 10 mils. The individual layers are of uniform thickness across the entire width.

Thus, there has been provided according to the invention a process for co-extruding multi-layered sheeting having uniform layer thicknesses.

While the fundamental novel features and advantages of the invention have been pointed out in connection with a few illustrated embodiments thereof, it will be appreciated that various obvious modifications of the co-extrusion process and apparatus will suggest themselves to one of ordinary skill in the art. Therefore, it is intended to be limited only by the scope of the following claims.

What is claimed is:

1. A co-extrusion apparatus for the production of multi-layered products of thermoplastic synthetic resins having selected numbers of layers, comprising:

a main extruder for producing a main heat-plastified resin stream;

at least one co-extruder for producing a side heat-plastified resin stream;

a co-extrusion feedblock, positioned downstream of said extruder and said co-extruder, comprising:

a main co-extrusion body having a central orifice providing for the passage therethrough of a base layer of said main resin stream;

at least one conduit means within said co-extrusion feedblock for receiving said side heat-plastified resin stream from said co-extruder, for splitting said side resin stream into two sub-streams and for transporting said sub-streams through said feedblock, said conduit means comprising a vertical shaft which divides into two horizontally projecting sub-conduits parallel to one another, said two sub-conduits being engaged by adjustment means which control the level of flow of said sub-streams, said adjustment means being internal to said co-extrusion feedblock and comprising means for external adjustment thereof;

at least one slotted plate positioned on either side of said main co-extrusion body transverse to the direction of flow of said main resin stream, including:

a central orifice aligned with the central orifice of said main co-extrusion body, slotted portions on either side of said central orifice for laying down layers of said side resin stream upon said main resin stream, each of said slotted portions comprising a circular bore area extending partially through the thickness of said slotted plate and positioned opposite each other in regard to said central orifice and having a slot connecting each of said bores to said orifice, wherein each of said bore areas operatively engages said conduit means of said main co-extrusion body to provide for the passage of said sub-streams from said main co-extrusion body into said bore areas and along said slots to be applied to said main resin stream to form a combined stream, and valve means for internally controlling the flow of each of said sub-streams by means external of said valve plate comprising two circular camsert cavities extending partially through the thickness of said plate, said cavities being positioned opposite each other in regard to said central orifice and opening into said slotted portions extending longitudinally from said central orifice and each cavity housing an adjustable camsert which is movable within said cavity and, upon adjustment, extends into said slotted portion to control the flow of resin flow, and a sheeting die downstream of said co-extrusion block for receiving said combined stream and for forming the multi-layered product into a multi-layered sheet.

2. A co-extrusion apparatus as claimed in claim 1, wherein said co-extrusion feedblock further comprises:
a main co-extrusion body positioned between said main extruder and said sheeting die, said body comprising a central orifice aligned with said central orifice of said slotted plate providing for the passage of said base layer therethrough.

3. A co-extrusion apparatus as claimed in claim 1, wherein said camsert comprises an elliptically-shaped orifice housing an eccentric, said eccentric upon rotation positions said camsert within said cavity.

4. A co-extrusion apparatus as claimed in claim 3, further comprising an external means for rotating said eccentric.

5. A co-extrusion apparatus as claimed in claim 4, wherein said eccentric rotating means comprise screws.

6. A co-extrusion apparatus as claimed in claim 1, wherein said stream splitting means divides said co-extruded stream into two streams and returns said divided co-extruded streams to said bores of said slotted plate.

7. A co-extrusion apparatus as claimed in claim 1, wherein said flow-varying means are internal to said co-extrusion block and comprise means for external adjustment thereof.

8. A co-extrusion apparatus as claimed in claim 7, wherein said flow-varying means comprises screws.

9. A co-extrusion apparatus as claimed in claim 7, wherein said flow-varying means is capable of completely retarding the flow of said side resin stream through one of said sub-streams 10. A co-extrusion apparatus as claimed in claim 1, comprising two of said slotted valve plates positioned at opposite sides of said main co-extrusion body in the direction of travel of said base layer, and wherein said co-extrusion block further comprises a second conduit means and a second adjustment means for said second slotted valve plate.

11. A co-extrusion apparatus as claimed in claim 10, comprising a second co-extruder connected upstream of said feedblock for supplying a second side stream of heat-plastified resin to said second slotted plate.

* * * * *